3,007,958
POLY-HALOGEN-CONTAINING POLYHYDRIC COMPOUNDS
Paul Robitschek, Buffalo, and Claude Thomas Bean, Jr., Niagara Falls, N.Y., assignors to Hooker Chemical Corporation, Niagara Falls, N.Y., a corporation of New York
No Drawing. Filed Sept. 10, 1952, Ser. No. 308,922
4 Claims. (Cl. 260—468)

This invention relates to new halogen-containing polyhydric compounds and to methods for manufacturing the same, comprising the diene synthesis of a hexahalocyclopentadiene with a polyhydric dienophile. More particularly, this invention relates to the products of reacting hexahalocyclopentadiene with a member selected from the group consisting of alkene diols, and ethers or esters derived from polyhydric alcohols having at least three hydroxyl groups, one of which is etherified or esterified with an unsaturated alcohol or unsaturated acid reactive with hexahalocyclopentadiene in the diene synthesis. Among the products contemplated by this invention, as thus designated, are the following compounds:

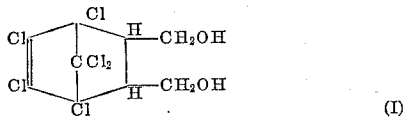

1,4,5,6,7,7-hexachlorobicyclo-(2.2.1)-5-heptene-2,3-dimethanol

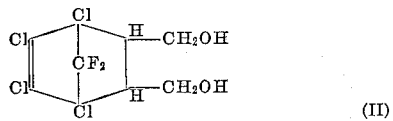

1,4,5,6-tetrachloro-7,7-difluorobicyclo-(2.2.1)-5-heptene-2,3-dimethanol

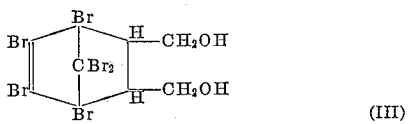

1,4,5,6,7,7-hexabromobicyclo-(2.2.1)-5-heptene-2,3-dimethanol

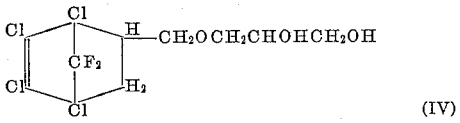

3-(1,4,5,6-tetrachloro-7,7-difluorobicyclo-(2.2.1)-5-heptene-2-yl)-methoxy-1,2-propane diol

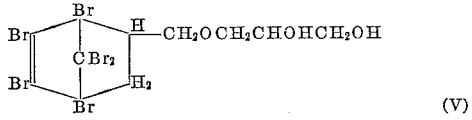

3-(1,4,5,6,7,7-hexabromobicyclo-(2.2.1)-5-heptene-2-yl)-methoxy-1,2-propane diol

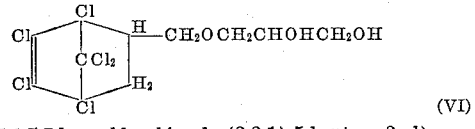

3-(1,4,5,6,7,7-hexachlorobicyclo-(2.2.1)-5-heptene-2-yl)-methoxy-1,2-propane diol This list of compounds is given for purpose of illustration and is not intended to be limitive.

In preparing such compounds of this invention a solvent may or may not be employed; if used, it should be inert with respect to the reactants and the reaction products, and, should have a sufficiently high boiling point to allow for reaction at elevated temperatures without necessitating the application of superatmospheric pressure. The reaction temperatures employed are greater than 100 degrees centigrade, and in order to obtain high conversion, are preferably between about 125 and 250 degrees centigrade. The time allowed for the reaction will vary with the purity of the reactants, the degree of completion of reaction desired, the solvents employed, etc. The reaction product resulting from the chemical addition reaction is preferably purified in order to obtain a light colored product. Ordinary purification procedures known in the art such as, washing, adsorbent decolorization, recrystallization, etc., may be satisfactorily employed.

The chlorine-containing dibasic alcohols which are a preferred class of compounds embraced within our invention, resulting from the reaction of hexachlorocyclopentadiene and a dienophilic diol have a high percentage of chlorine, good stability to hydrolysis and high heat stability at elevated temperatures, and have been found by us to have wide utility. For example, in addition to being useful as intermediates in general organic synthesis, these compounds of this invention are particularly useful as ingredients in making polyester resins and plasticizers.

In order that those skilled in the art may have sufficiently detailed instructions for preparing the compounds of this invention, it will be illustrated for the preparation of typical compounds embraced within its scope, in the examples which follow; however, this detailed disclosure is not to be construed as limiting the scope of compounds embraced within this invention as further indicated elsewhere herein.

EXAMPLE 1

To one mol (132.2 grams) of alpha allyl glycerol ether was added 250 milliliters of dry monochlorobenzene and 0.132 gram of hydroquinone. This mixture was heated to a reflux temperature of about 133 degrees centigrade, and then 306.8 grams (1.13 moles) of hexachlorocyclopentadiene was added thereto. The reaction mixture was heated to a reflux temperature between about 140 and 150 degrees centigrade for about 48 hours. At the end of the reflux period, the reaction mixture was stripped of its low boiling ingredients at pot temperatures up to about 150 degrees centigrade at 15 millimeters mercury pressure. The material recovered was then distilled at 1.0 millimeter mercury pressure to give 352.4 grams of a yellowish colored liquid boiling in a range at 204 to 214 degrees centigrade at one millimeter mercury pressure, representing a conversion based on the alcohol, of about 87 percent. The product recovered was analyzed and found to be 3-(1,4,5,6,7,7-hexachlorobicyclo-(2.2.1)-5-heptene-2-yl)-methoxy-1,2-propane diol having the following structural formula:

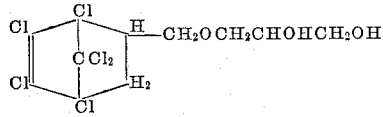

and having 52.6 percent actual chlorine content as compared to 52.5 percent for theory, and also having 0.86 percent hydrolyzable chlorine as determined by a test involving refluxing about three grams of a sample of the product for three hours in 50 milliliters of 95 percent ethanol containing seven grams of dissolved potassium hydroxide and analyzing for free chlorides developed by titration.

The following example illustrates a typical use of a compound of this invention in making an infusible, insoluble polyester resin having many valuable and desirable characteristics.

EXAMPLE 2

Twenty-four and five tenths parts of maleic anhydride and 101.3 parts of 3 - (1,4,5,6,7,7 - hexachlorobicyclo-(2.2.1) - 5 - heptene - 2 - yl) - methoxy - 1,2 - propanediol, prepared after Example 1, were charged into a resin vessel, then blanketed with an inert atmosphere, agitated and heated to 160 degrees centigrade for sixteen hours. A very light-yellow, hard, brittle resin was obtained, having an acid number of 43. This resin was compounded with 30 parts of styrene and 0.03 part of hydroquinone per hundred parts of resin; this gave a light colored viscous liquid containing 33 percent chlorine. The compounded resin, catalyzed by one percent of its weight of benzoyl peroxide, cured to a hard, tough, light colored polymer which was insoluble and infusible, and immediately self-extinguishing on removal from an oxidizing flame.

Among other compounds of this invention which may be prepared in a manner after Example 1 are the following:

EXAMPLE 3

To one mole (88 grams) of butene diol was added 100 milliliters of anhydrous benzene and 0.4 gram of tertiary butyl catechol. This mixture was heated to reflux and 273 grams of (1 mol) of hexachlorocyclopentadiene was added thereto. The reaction mixture was then refluxed for about 50 hours. Thereafter, the reaction product was heated about 15 centigrade degrees above the reflux temperature at reduced pressure to remove the low-boiling substituents. The yield of 1,4,5,6,7,7 - hexachlorobicyclo - (2.2.1) - 5 - heptene - 2,3 - dimethanol so produced was about 68 percent, based on the diol employed. The reaction proceeded according to the following equation:

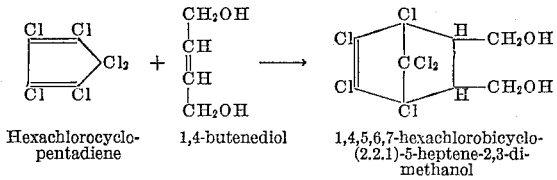

Hexachlorocyclopentadiene + 1,4-butenediol → 1,4,5,6,7-hexachlorobicyclo-(2.2.1)-5-heptene-2,3-dimethanol

EXAMPLE 4

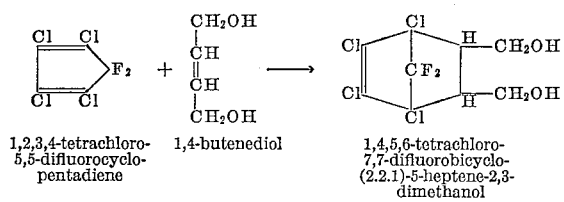

1,2,3,4-tetrachloro-5,5-difluorocyclopentadiene + 1,4-butenediol → 1,4,5,6-tetrachloro-7,7-difluorobicyclo-(2.2.1)-5-heptene-2,3-dimethanol The difluoro-starting compound above is a new compound and may be prepared in the following manner:

*Example of preparation of difluorotetrachlorocyclopentadiene*

Difluorohexachlorocyclopentene was prepared according to the procedure of McBee et al. (U.S. Patent 2,459,783) by treating octachlorocyclopentene with antimony pentafluoride at a fluorinating temperature between about room temperature and about 250 degrees centigrade. The desired difluorohexachlorocyclopentene had a boiling point of 95 degrees centigrade at ten millimeters of mercury pressure.

Thirty-two and seven-tenths (32.7) grams (0.5 mol) of zinc dust was added to a one-liter, three-necked flask fitted with a stirrer, condenser, and dropping funnel, and a solution of 0.5 gram of copper sulfate

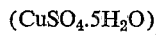

in fifty milliliters of water added to the zinc dust, accompanied by stirring and cooling of the flask contents. Ninety-three and four-tenths (93.4) grams (0.3 mol) of $C_5F_2Cl_6$, boiling at 93–94 degrees centigrade at ten millimeters of mercury pressure, was then added dropwise to the stirred mixture over a period of two hours. During the course of the reaction, a total of twenty milliliters of concentrated hydrochloric acid was added in small portions in order to keep the reaction proceeding smoothly. At the end of the two-hour period, the contents of the reaction flask was filtered and the organic layer separated and washed with successive portions of distilled water. The thus-washed organic layer was then dried over anhydrous calcium sulfate (Drierite) and distilled from a Claisen flask under reduced pressure, the first fraction distilling at 58–60 degrees centigrade primarily at ten millimeters of mercury pressure. Forty-seven (47) grams of difluorotetrachlorocyclopentadiene (1,2,3,4-tetrachloro-5,5-difluorocyclopentadiene) boiling at 58–60 degrees centigrade was obtained together with a dark, polymeric residue of 11.5 grams. The total conversion was about 82 percent.

EXAMPLE 5

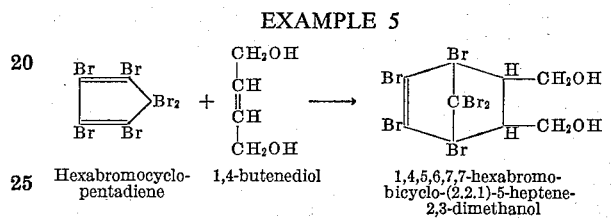

Hexabromocyclopentadiene + 1,4-butenediol → 1,4,5,6,7,7-hexabromo-bicyclo-(2.2.1)-5-heptene-2,3-dimethanol

EXAMPLE 6

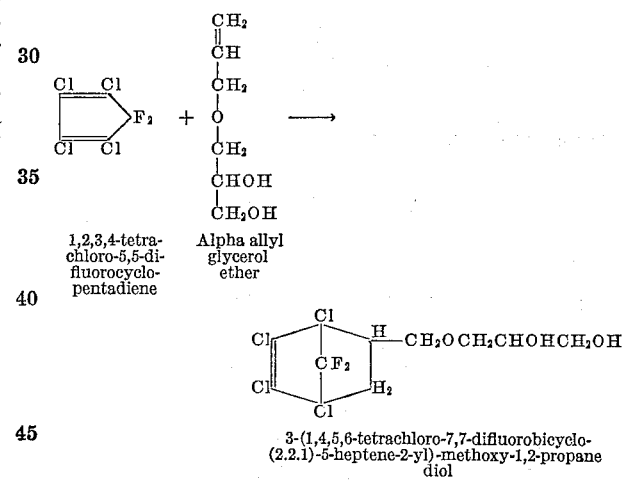

1,2,3,4-tetrachloro-5,5-difluorocyclopentadiene + Alpha allyl glycerol ether 3-(1,4,5,6-tetrachloro-7,7-difluorobicyclo-(2.2.1)-5-heptene-2-yl)-methoxy-1,2-propane diol

EXAMPLE 7

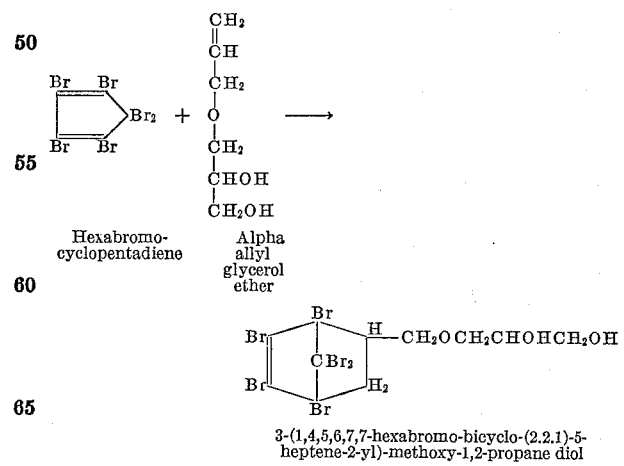

Hexabromocyclopentadiene + Alpha allyl glycerol ether 3-(1,4,5,6,7,7-hexabromo-bicyclo-(2.2.1)-5-heptene-2-yl)-methoxy-1,2-propane diol As used herein and in the appended claims the term "halo" includes the chloro, bromo and fluoro substituted cyclopentadienes wherein all of the hydrogens are replaced by one or more of the foregoing halogens. While hexachlorocyclopentadiene is today the most readily available commercial hexahalocyclopentadiene, we have found that the mixed perhalo compounds are useful in making Diels-Adler adducts which can be chemically combined into polyester compositions. In fact, hexachlorocyclopentadiene in which one or two of the chlorine atoms has been replaced with bromine, appears to afford a high degree of flame retardance in polyester resins. The polyester resins made from a hexahalocyclopentadiene in which some of the chlorine of hexachlorocyclopentadiene has been replaced with fluorine atoms, are exceedingly interesting materials possessing enhanced heat resistance and aging properties.

Also, the unsaturated polyhydric compounds which are useful for making compositions of this invention may be selected from the unsaturated alkene or alkyne polyhydric alcohols, such as, butene diol, butyne diol, pentene diol, pentyne diol, and more generally, those of the lower aliphatic series having at least one reactive unsaturated carbon-carbon bond and at least two hydroxy groups.

In addition, the reaction products of polyhydric compounds having at least three hydroxyl groups, one of which is esterified or etherified with an unsaturated alcohol or acid dienophile are another class of compounds which may be reacted with a hexahalocyclopentadiene, in the diene synthesis, to produce a polyhalogen-containing polyhydric compound embraced within this invention. Among such reactants which may be employed in the reaction with a hexahalocyclopentadiene are allyl or vinyl glycerol ethers, allyl or vinyl pentaerythritol ethers and unsaturated acid esters such as the acrylic and methacrylic esters, of glycerol, pentaerythritol, and similar polyhydroxy compounds.

The compounds of this invention, as has been exemplified hereinbefore, are useful as intermediates in the preparation of polyester resins of the thermosetting type, which may be readily formed into useful articles of commerce without the necessity of utilizing extreme pressures. In addition, the compounds of this invention are useful in the preparation of plasticizers for polyvinyl compounds, particularly polyvinyl chloride and copolymers thereof. The compounds of this invention are also useful in the preparation of alkyd resins which may be formulated into adhesives, paints and varnishes to produce modifications not obtainable heretofore by the materials commonly employed.

Still other uses are contemplated for the compounds of this invention and it is to be understood that our invention is not to be construed as limited except as defined in the appended claims.

We claim:
1. The Diels-Alder adduct of hexachlorocyclopentadiene and, as the dienophile, an unsubstituted loweraliphatic compound selected from the group consisting of the mono-alkene diols, mono-alkyne diols, polyhydric compounds having at least three hydroxyl groups of which one hydroxyl group is etherified by a monounsaturated monohydric alcohol dienophile, and polyhydric compounds having at least three hydroxyl groups of which one hydroxyl group is esterified by a monounsaturated monocarboxylic acid dienophile.

2. 1,4,5,6,7,7 - hexachlorobicyclo - 5 - heptene - 2,3 - dimethanol.

3. 1,4,5,6,7,7 - hexachlorobicyclo - (2.2.1) - 2,5 - heptadiene-2,3-dimethanol.

4. 3 - (1,4,5,6,7,7 - hexachlorobicyclo - (2.2.1) - 5-heptene-2-yl)-methoxy-1,2-propane diol.

References Cited in the file of this patent
UNITED STATES PATENTS

| | | |
|---|---|---|
| 2,352,606 | Alder et al. | July 4, 1944 |
| 2,421,597 | Bruson | June 3, 1947 |
| 2,528,656 | Herzfeld | Nov. 7, 1950 |

OTHER REFERENCES

Prill: Jour. Amer. Chem. Soc., volume 69 (1947), pages 62–63 (2 pages).

UNITED STATES PATENT OFFICE
CERTIFICATE OF CORRECTION

Patent No. 3,007,958                              November 7, 1961

Paul Robitschek et al.

It is hereby certified that error appears in the above numbered patent requiring correction and that the said Letters Patent should read as corrected below.

Column 3, line 41, for "1,4,5,6,7-hexachlorobicyclo-" read -- 1,4,5,6,7,7-hexachlorobicyclo- --; column 4, line 75, for "Diels-Adler" read -- Diels-Alder --; column 6, line 22, for "1,4,5,6,7,7-hexachlorobicyclo-5-heptene-2,3-di-" read -- 1,4,5,6,7,7-hexachlorobicyclo-(2.2.1)-5-heptene-2,3-di- --.

Signed and sealed this 15th day of June 1965.

(SEAL)
Attest:

ERNEST W. SWIDER                                  EDWARD J. BRENNER
Attesting Officer                                      Commissioner of Patents